(12) United States Patent
Han et al.

(10) Patent No.: US 8,418,504 B2
(45) Date of Patent: Apr. 16, 2013

(54) METHOD OF FABRICATING OPTICAL FIBER OR OPTICAL DEVICE DOPED WITH REDUCED METAL ION AND/OR RARE EARTH ION

(75) Inventors: Won-Taek Han, Gwangju (KR); Yune-Hyoun Kim, Daejon (KR); Tae-Jung Ahn, Gwangju (KR)

(73) Assignees: Optonest Corporation, Gwangju (KR); K-JIST (Kwangju Institute of Science and Technology), Gwangju (KR)

(*) Notice: Subject to any disclaimer, the term of this patent is extended or adjusted under 35 U.S.C. 154(b) by 833 days.

(21) Appl. No.: 11/895,737

(22) Filed: Aug. 27, 2007

(65) Prior Publication Data
US 2007/0289333 A1    Dec. 20, 2007

Related U.S. Application Data

(63) Continuation-in-part of application No. 10/701,175, filed on Nov. 4, 2003, now abandoned.

(51) Int. Cl.
*C03B 37/012*    (2006.01)

(52) U.S. Cl.
USPC .................................. 65/390; 65/399; 65/424

(58) Field of Classification Search ............... 65/390, 65/399, 424
See application file for complete search history.

(56) References Cited

U.S. PATENT DOCUMENTS
5,203,899 A * 4/1993 Kyoto et al. ................. 65/398

OTHER PUBLICATIONS

Kim et al. "Fabrication of Tm2+/Tm3+ Co-Doped Silica Fiber and its Fluorescence Characteristics" OFC 2003/ vol. 1, pp. 301-302 ( Mar. 26, 2003).*

* cited by examiner

*Primary Examiner* — John Hoffman
(74) *Attorney, Agent, or Firm* — Osha Liang LLP

(57) ABSTRACT

Disclosed is a method of fabricating an optical fiber or an optical device doped with reduced metal ion and/or rare earth ion, comprising steps of: forming a partially-sintered fine structure in a base material for fabricating the optical fiber or the optical device; soaking the fine structure into a doping solution containing a reducing agent together with metal ion and rare earth ion during a selected time; drying the fine structure in which the metal ion and/or rare ion are/is soaked; and heating the fine structure such that the fine structure is sintered.

6 Claims, 3 Drawing Sheets

METHOD OF FABRICATING OPTICAL FIBER OR OPTICAL DEVICE DOPED WITH REDUCED METAL ION AND/OR RARE EARTH ION

CROSS-REFERENCE TO RELATED APPLICATIONS

This is a Continuation-in-Part Application of U.S. patent application Ser. No. 10/701,175, filed on Nov. 4, 2003, now abandoned which is incorporated by reference in its entirety.

BACKGROUND OF INVENTION

1. Field of the Invention

The present invention relates generally to a technology for fabricating an optical fiber or an optical device, and more particularly to a method of fabricating an optical fiber or an optical device doped with reduced metal ion(s) and/or rare earth ion(s).

2. Background Art

An optical fiber containing metal ion and/or rare earth ion is brought under a special optical fiber, since it can be variously applied to an optical amplifier or an optical switching device etc. Therefore, much of the research in this area has been performed.

One of the research projects is a technique of reducing doped metal ion and/or rare earth ion, Generally, an atom has a different energy level distribution depending on its valence, and therefore has different spectroscopic characteristics such as light absorption and light emission. Accordingly, a little more diverse light absorption and light emission can be obtained by utilizing the change of valence and thereby the optical fiber and the optical device having various optical amplification and optical switching characteristics can be obtained.

As an example, let us consider rare earth ions, when a rare earth ion has the valence of 3+, the light absorption characteristic due to electronic transition between 4 f electron orbit and 5 d electron orbit occurs only in an ultraviolet wavelength region, whereas when the valence of the rare earth ion changes to 2+ ion, such a light absorption characteristic occurs in both visible and infrared wavelength regions. For this reason, a technique of making doped metal ion and rare earth ion with desired valences, respectively, is required. Furthermore, every atom has its own valence states in which the atom is mainly existed in nature and thus a specific process is required in order to transfer the valence into another valence.

For example, most of the rare earth ions have the valence of 3+. In order to stably transfer the valence of 3+ into the valence of 2+, 1+ or 0, it is necessary to reduce the rare earth ions. There have been proposed various reduction treatment methods as described below.

Firstly, there is a method of applying gamma rays to the rare earth metal ion having the valence of 3+. For example, it is reported that $Tm^{2+}$ can be obtained, if the gamma rays is applied to a $CaF_2$ crystal containing $Tm^{3+}$.

However, in this method, there is a problem that a gamma ray source is dangerous to handle and the cost required in handling it safely is thus expensive.

Secondly, there is another method in which an aerosol type material is utilized. In this method, a MCVD (modified chemical vapor deposition) process is indispensable. In other words, this method includes the MCVD process in which a glass layer containing rare earth ions is deposited in a quartz glass tube, using material having aerosol formulation which generates carbon, together with a powder which generates rare earth ion and glass when fired. Then, processes of removing the carbon and OH radical, sintering the glass and collapsing the glass tube are, in turn, performed to thus obtain an optical fiber preform. For example, in a glass optical fiber having $SiO_2$—$Al_2O_3$ components, $Eu^{2+}$ and $Sm^{2+}$ are reduced from $Eu^{3+}$ and $Sm^{3+}$, respectively.

To date, this method which utilizes the material having aerosol formulation is performed through only the MCVD process. A desired rare earth ion material having aerosol formulation and an additional apparatus for supplying material having aerosol formulation are needed.

Further, there is a method of injecting a mixture of $H_2$ and Ar gases and obtaining the reduced rare earth ion during melting of glass. For example, in a glass having $SiO_2$—$Al_2O_3$ components or $SiO_2$—$B_2O_3$ components, $Sm^{2+}$ is reduced from $Sm^{3+}$.

In this method, there is a problem that processes of fabricating the optical fiber preform are complicated in comparison with the conventional processes and are not yet commercialized

SUMMARY OF INVENTION

Therefore, it is an object of the present invention to provide a method of fabricating an optical fiber or an optical device, in which metal ion and/or rare earth ion safely and facilely reduced, in comparison with the prior art methods, together with the utilization of the prior art processes of fabricating the optical fiber and/or the optical device.

To achieve the aforementioned object of the present invention, a method according to the present invention is characterized by forming a partially-sintered fine structure in a base material for fabricating an optical fiber or an optical device and soaking the fine structure into a doping solution, which contains a reducing agent and a metal ion and/or a rare earth ion, for a selected duration, thus doping the fine structure with the metal ion and/or rare earth ion together with the reducing agent. Therefore, reduced metal ion and/or rare earth ion through the reducing agent is obtained.

One method according to the present invention of fabricating an optical fiber or an optical device doped with reduced metal ion and/or rare earth ion comprising the steps of: forming a partially-sintered fine structure in a base material for fabricating the optical fiber or the optical device; soaking the fine structure into a doping solution, which contains a reducing agent and a metal ion and/or a rare earth ion, for a selected duration; drying the fine structure in which the metal ion and/or rare ion is soaked; and heating the fine structure such that the fine structure is sintered.

Another method of fabricating an optical fiber or an optical device doped with reduced metal particle and/or rare earth element, comprising steps of: forming a partially-sintered fine structure in a base material for fabricating the optical fiber or the optical device; soaking the fine structure into a doping solution, which contains a reducing agent having a strong reduction potential and a metal ion and/or a rare earth ion, for a selected duration; drying the fine structure in which the metal ion and/or the rare earth ion is/are soaked; and heating the fine structure such that the fine structure is sintered, thereby forming the metal particle and/or the rare earth elements.

Preferably, the reducing agent is an organic reducing agent, such as glucose, sucrose, glycerin, dextrin, benzene, phenol, hexane, toluene, styrene, naphthalene, and the like.

In addition, the reducing agent may be orthoesters (esters of ortho acids), such as TEOS (tetraethyl orthosilicate), TMOS (tetramethyl orthosilicate), TEOC (tetraethyl orthocarbonate), TMOC (tetramethyl orthocarbonate) and the like.

Preferably, the metal ion and/or rare earth ion is at least one ion selected from the group consisting of Ce, Pr, Nd, Pm, Sm, Eu, Gd, Th, Dy, Ho, Br, Tm, Yb, Lu, Al, Sc, Ti, V, Cr, Mn, Fe, Co, Ni, Cu, Zn, Y, Zr, Nb, Mo, Tc, Ru, Rh, Pd, Ag, Cd, In, Sn, Hf, Ta, W, Re, Os, Ir, Pt, Au, Tl, Pb, Bi and a mixture thereof.

Further, the base material for fabricating the optical fiber or the optical device has a basic composition comprising a silicon oxide or a composite oxide of a silicone oxide and an oxide; in which the oxide is at least one selected from the group consisting of germanium oxide ($GeO_2$), boron oxide ($B_2O_3$), phosphorous oxide ($P_2O_5$), and titanium oxide ($TiO_2$).

Preferably, the base material for fabricating the optical fiber or the optical device has a basic composition selected from silica ($SiO_2$), germanosilicate ($SiO_2$-$GeO_2$), phosphorosilicate ($SiO_2$-$P_2O_5$), phosphorogermanosilicate ($SiO_2$-$GeO_2$-$P_2O_5$), borosilicate ($SiO_2$-$B_2O_3$) borophosphorosilicate ($SiO_2$-$P_2O_5$-$B_2O_3$), borogermanosilicate ($SiO_2$-$GeO_2$-$B_2O_3$), titanosilicate ($SiO_2$-$TiO_2$) phosphorotitanosilicate ($SiO_2$-$TiO_2$-$P_2O_5$), or borotitanosilicate ($SiO_2$-$TiO_2$-$B_2O_3$).

Preferably, the step of forming the partially-sintered fine structure in the base material for fabricating the optical fiber or the optical device is performed by a process selected from MCVD (modified chemical vapor deposition), VAD (vapor-phase axial deposition), VOD (outside vapor deposition), FHD (flame hydrolysis deposition), etc.

The optical device in the present invention includes a planar optical amplifier, an optical communication laser, and a planar optical switch device, and the like.

Other aspects and advantages of the invention will be apparent from the following description and the appended claims.

BRIEF DESCRIPTION OF DRAWINGS

The above objects and another advantages of the present invention will become more apparent by describing in detail preferred embodiments thereof with reference to the attached drawings in which.

DETAILED DESCRIPTION

Figure 1:
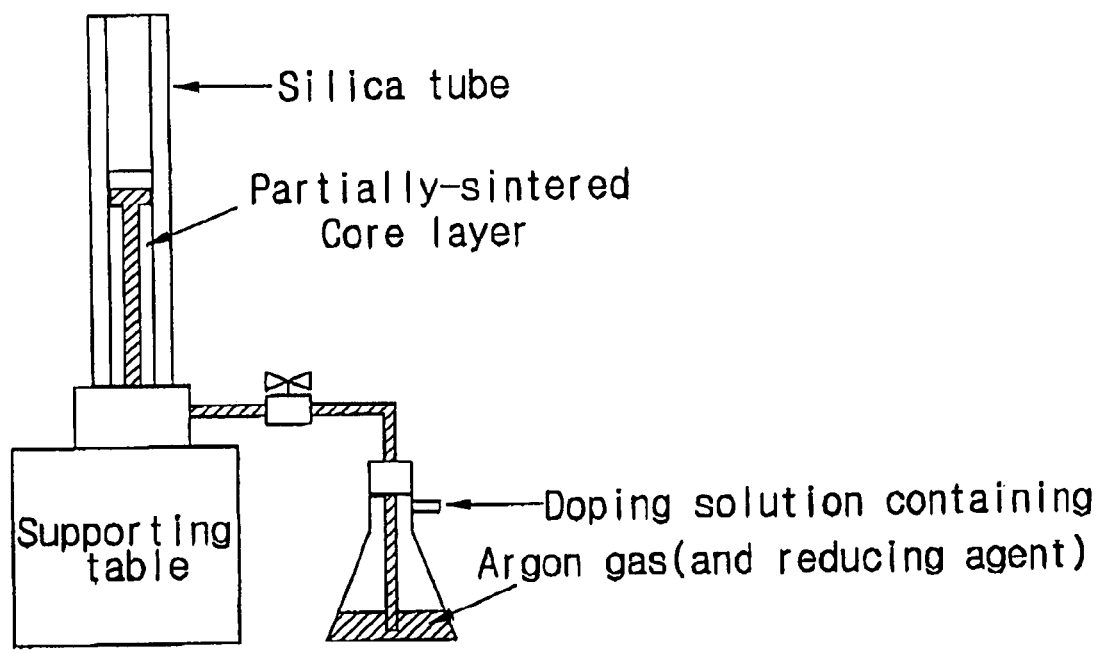
FIG. 1 is a schematic view showing an apparatus for performing processes of the present invention.

Now, preferred embodiments of the present invention will be described in detail with reference to the annexed drawings.

A method of the present invention comprises a step of forming a partially-sintered fine structure in a base material for fabricating an optical fiber or an optical device, and a step of soaking the fine structure in a doping solution, which contains an organic reducing agent and a metal ion and/or a rare earth ion for 1 to 1.5 hours. That is, the fine structure of the base material is doped with a reducing agent and a metal ion and/or a rare earth ion, and then the metal ion and/or rare earth ion is reduced by the doped reducing agent.

Methods of the present invention use a modification of a solution doping technique for adding a rare earth ion and/or a metal ion to an optical fiber or an optical device. This solution doping technique is a method of doping a metal ion or a rare earth ion in an optical fiber core, which can be fabricated with any of conventional methods of fabricating an optical fiber preform, such as MCVD (modified chemical vapor deposition), VAD (vapor-phase axial deposition), OVD (outside vapor deposition), etc. The solution doping technique is also used as the technique which may dope all of the rare earth ion and/or the metal ion, capable of being formed into a solution type, even in a method of fabricating a plane glass optical device through a FHD (flame hydrolysis deposition) process.

For example, a solution doping technique, as disclosed in J. E. Townsend, et al. "Solution for fabrication of rare earth doped optical fibers", Electron, Lett., Vol. 23, p.p. 329-331, 1987), coupled with the MCVD process is as follows. Herein, in order to obtain reduced rare earth ion, an aqueous solution, in which sucrose as a strong reducing agent is dissolved together with a rare earth chloride, is used as a doping solution. First, a core layer partially sintered and having a plurality of pores is formed in a silica tube using the conventional MCVD process (please refer to MacChesney et. al., "Optical fiber fabrication and resulting product", U.S. patent, 1997). Then, the silica tube is filled with the aqueous solution, in which the sucrose is dissolved together with the rare earth chloride. The aqueous solution is held for 1 to 1.5 hours to allow the solution to sufficiently permeate into the pores of the core layer, and then the solution is discharged. As a result, the doping solution remains in the pores. The core layer doped with the aqueous solution is dried, while the silica tube is held at a temperature of 100 to 250° C. with a stream of an inert gas (such as helium gas) only, using the MCVD process. At this time, ethanol and moisture is removed. Subsequently, using hydrogen-oxygen flames, the core layer is heated at a high temperature of 2000° C. until carbon generated from the sucrose is removed and the core layer is completely sintered (referring to M. F. Yan, et al., "Sintering of optical wave-guide glasses", J. of Mater. Sci., p.p. 1371-1378, 1980). After that, the optical fiber preform is fabricated through a collapsing step in which the tube is heated to more than 2200° C. with continuous purging of an inert gas, using the hydrogen-oxygen flames. The optical fiber preform is drawn to produce an optical fiber doped with the reduced rare earth ion.

The sucrose contained in the doping solution is composed of C, H and O components. While not intending to be bound by any particular mechanism, the inventors speculate the following mechanism may contribute to the reduction. During the above drying step, most of the H and O components among the above components may be removed and the carbon (C) may remain. Some of the carbon (C) may combine with Oxygen ($O_2$) remained at the high temperature of about 2000° C. to form carbon monoxide (CO), and carbon monoxide thus formed may contribute to the reduction of the doped rare earth ion. At this time, the reaction temperature at which the carbon monoxide (CO) is formed may be decided within the possible range of reduction of the rare earth ion, using an Ellingham Diagram. At the same time, a strong reduction atmosphere is created by injecting only the inert gas into the silica glass tube, so that the carbon (C) may also participate in the reduction reaction of rare earth ion. Further, preferably, an inert gas only is also passed through during the collapsing step for fabricating the optical fiber preform, thereby creating a reduction atmosphere at its maximum.

Embodiment 1

First, thulium chloride hexahydrate ($TmCl_3.6H_2O$) of 0.04M and sucrose ($C_{12}H_{22}O_{11}$) of 2.17M are dissolved in deionized water to prepare a doping solution containing rare earth ion ($Tm^{3+}$) and the sucrose as a reducing agent. Herein, an organic reducing agent or an orthoester may be used as the reducing agent.

As shown in FIG. 1, a porous fine structure is formed through an MCVD process at an inner wall of a silica glass tube having an inner diameter of 19 mm and an outer diameter of 25 mm so that the portion thereof to form an optical fiber core has a basic glass composition of $SiO_2$—$GeO_2$. The pre-made doping solution is injected into the above glass tube and discharged after 1 hour. Then, the core layer is dried by heating the glass tube again at a temperature of 100 to 250° C. using the MCVD apparatus with the purge of only helium gas through the glass tube.

Then, the above sintering step and collapsing step are repeatedly performed 8 times and 15 times, respectively, at a temperature of 2000° C., thereby obtaining an optical fiber preform doped with $Tm^{2+}$ ion. The optical fiber preform may be drawn to fabricate an optical fiber. Herein, even when a sintering step is carried out at a temperature of 1600 to 2200° C., the same result is also obtained.

Figure 2:
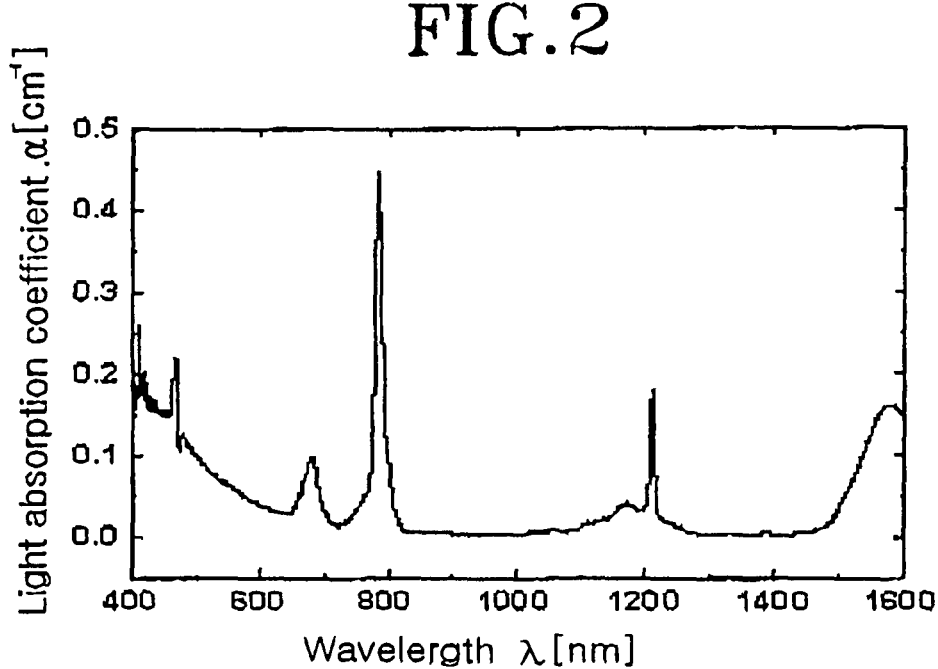
FIG. 2 is graph showing a light absorption spectrum of an optical fiber doped with reduced rare earth ion ($Tm^{2+}$) fabricated by a first embodiment of the present invention.

A light absorption spectrum of the optical fiber fabricated using the doping solution containing sucrose as a reducing agent is shown in FIG. 2. Light absorption spectrum of FIG. 2 shows that light absorption peaks at 465 nm, 680 nm, 785 nm, 1210 nm, and 1600 nm arise $Tm^{3+}$ ion, and light absorption spectrum distributed in a broad range between 400 nm and 900 nm is from $Tm^{2+}$ ion.

COMPARATIVE EXAMPLE 1

Thulium chloride hexahydrate ($TmCl_3.6H_2O$) of 0.04M and aluminum chloride hexahydrate ($AlCl_3.6H_2O$) of 0.19M are dissolved in ethanol to prepare a doping solution without containing sucrose as the reducing agent.

A core layer having a porous fine structure is formed at an inner wall of a silica glass tube in the same method as the embodiment 1. The pre-made doping solution is injected into the glass tube and discharged after 1 hour. Then, the core layer is dried together with the purge of helium, oxygen and chlorine through the tube.

Then, the above sintering step and collapsing step are repeatedly performed 3 times and 7 times, respectively, at a temperature of 2000° C., thereby obtaining an optical fiber preform doped with $Tm^{3+}$ ion. The optical fiber preform is drawn to fabricate an optical fiber.

Figure 3:
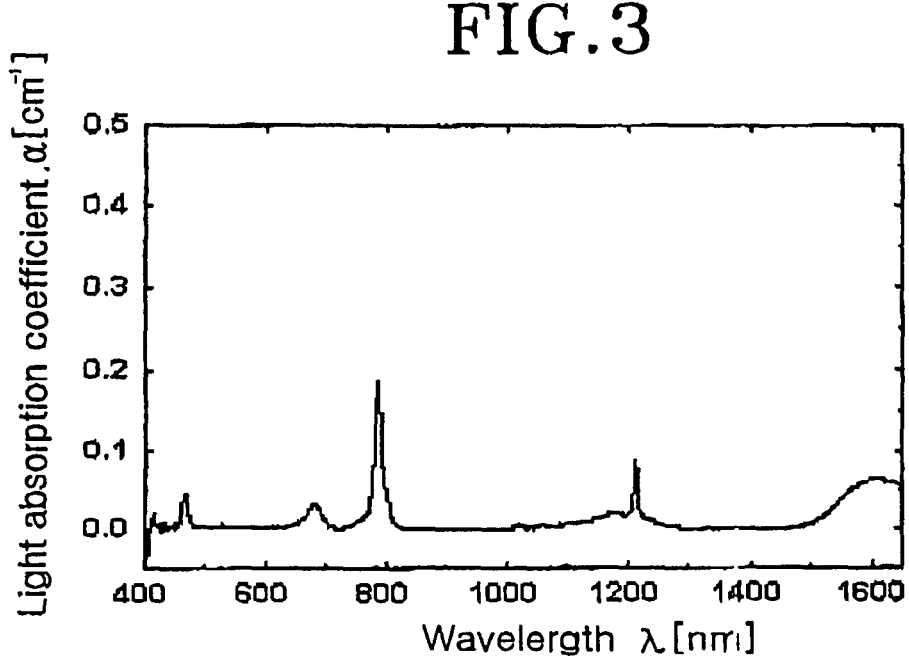
FIG. 3 is a graph showing a light absorption spectrum of an optical fiber fabricated by a comparative example 1 without using a reducing agent.

A light absorption spectrum of the optical fiber fabricated by using a doping solution that does not contain sucrose as a reducing agent is shown in FIG. 3. Different from the result of the embodiment 1 using the reducing agent, FIG. 3 shows only light absorption spectrum from $Tm^{3+}$ ion.

Embodiment 2

Europium chloride ($EuCl_3.xH_2O$) of 0.097M and sucrose ($Cl_2H_{22}O_{11}$) of 0.518M are dissolved in deionized water to prepare a doping solution containing rare earth ion ($Eu^{3+}$) and sucrose as a reducing agent.

Then, the optical fiber doped with $Eu^{2+}$ ion is fabricated by the same processes as described in embodiment 1.

Figure 4:
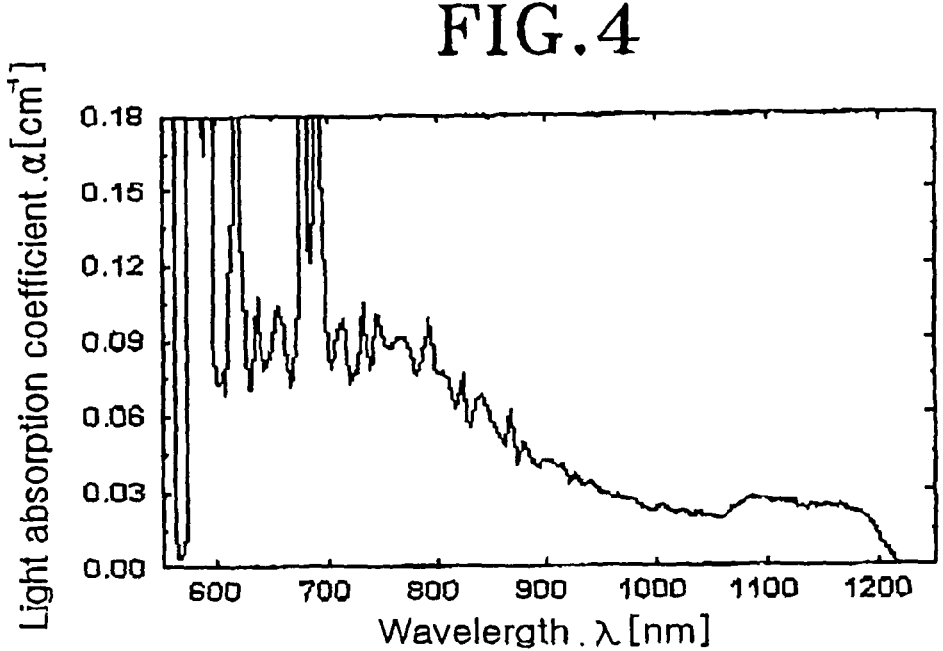
FIG. 4 is a graph showing a light absorption spectrum of an optical fiber doped with reduced rare earth ion ($Eu^{2+}$) fabricated by a second embodiment of the present invention.

A light absorption spectrum of the optical fiber fabricated by using the doping solution containing sucrose as the reducing agent is shown in FIG. 4. In the light absorption spectrum of FIG. 4, the light absorption spectrum distributed in a broad range between 600 nm and 1200 nm is from $Eu^{2+}$ ion. This spectrum is not shown in the case of $Eu^{3+}$ ion.

COMPARATIVE EXAMPLE 2

Europium chloride hydrate ($EuCl_3.xH_2O$) of 0.097M and aluminum chloride hexahydrate ($AlCl_3.6H_2O$) of 0.518M are dissolved in ethanol to prepare a doping solution that does not contain sucrose as a reducing agent.

Then, the optical fiber doped with $Eu^{3+}$ ion is fabricated by the same processes as described in the comparative example 1.

Figure 5:
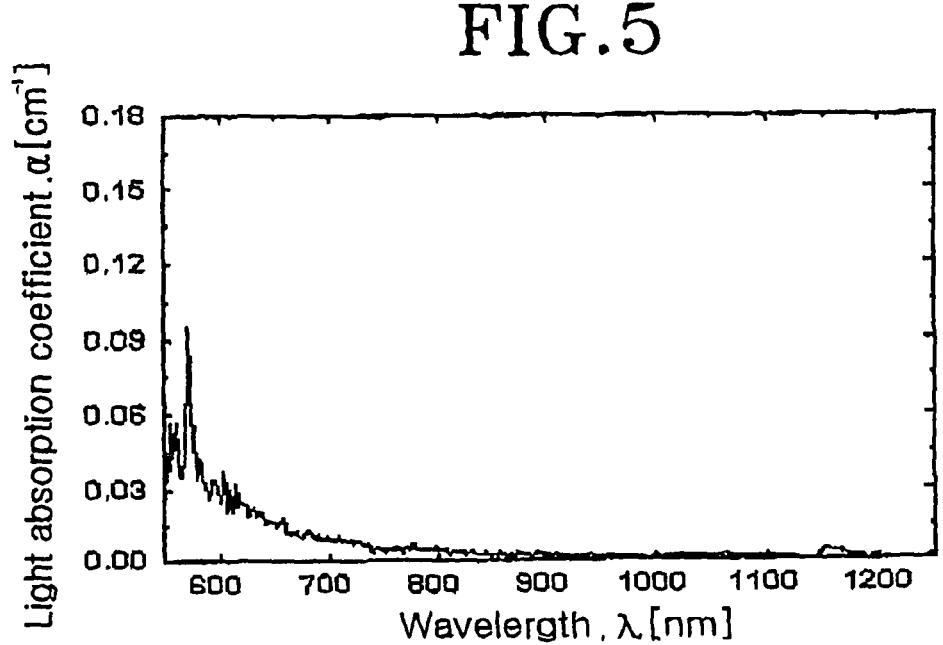
FIG. 5 is a graph showing a light absorption spectrum of an optical fiber fabricated by a comparative example 2 without using a reducing agent.

A light absorption spectrum of the optical fiber fabricated by using the doping solution that does not contain sucrose as a reducing agent is shown in FIG. 5. Different from the result of the embodiment 2 using the reducing agent, FIG. 5 shows only light absorption spectrum from $Eu^{3+}$ ion.

The above embodiments 1 and 2 illustrate that the optical fibers perform doped with $Tm^{2+}$ ion and $Eu^{+2}$ ion, respectively, by the doping solutions containing reducing agents are obtained. Depending on the intensity of reduction potential that the reducing agent has, it is confirmed that metal ion or rare earth ion having 3+ valence may be converted to 2+ valence or 1+, and in some cases to "0" valence. When the metal ion or rare the earth ion is reduced to "0" valence, an optical fiber preform or an optical device preform doped with a metal ion or a rare earth ion is formed.

As described above, the present invention can fabricate an optical device doped with reduced metal ion and/or rare earth ion having a desire valence by a facile solution doping technique.

According to the present invention, an optical fiber or an optical device doped with a metal ion and/or a rare earth ion may be reduced by a reducing agent doped with a facile solution doping technique. There is no need to change the conventional MCVD, VAD, OVD processes, etc. in order to fabricate such optical fibers or devices.

Methods of the invention provide convenient ways to introduce metal ions or rare earth ions into optical fiber performs, wherein the metal ions or rare earth ions may be reduced in situ. Therefore, the optical fibers or devices may include metal ions or rare earth ions that have ions in different valence states as compared with the valence states of the ions in the starting doping solutions. The doping-reduction methods can have important applications where the salts having ions in the desired valence states may not be readily available or such salts may not be readily soluble for making a doping solution.

While the present invention has been described in detail, it should be understood that various changes, substitutions and alterations can be made hereto without departing from the spirit and scope of the invention as defined by the appended claims.

What is claimed is:

1. A method of fabricating an optical fiber or an optical device, comprising the steps of:
    forming a partially-sintered fine structure in a base material for fabricating the optical fiber or the optical device;
    soaking the partially-sintered fine structure in a doping solution, which contains a reducing agent and a doping ion selected from the group consisting of a metal ion, a rare earth ion, and a mixture thereof, for a selected duration;

drying the partially-sintered fine structure after having been soaked in the doping solution; and heating the partially-sintered fine structure after drying such that the doping ion is reduced, directly or indirectly, by the reducing agent and the partially-sintered fine structure is sintered, wherein the reducing agent is at least one selected from the group consisting of glucose, sucrose, glycerin, dextrin, benzene, phenol, hexane, toluene, styrene, naphthalene, TEOS (tetraethyl orthosilicate), TMOS (tetramethyl orthosilicate), TEOC (tetraethyl orthocarbonate), and TMOC (tetramethyl orthocarbonate).

2. The method of claim 1, wherein the doping ion is at least one selected from the group consisting of Ce, Pr, Nd, Pm, Sm, Eu, Gd, Tb, Dy, Ho, Er, Tm, Yb, Lu, Al, Sc, Ti, V, Cr, Mn, Fe, Co, Ni, Cu, Zn, Y, Zr, Nb, Mo, Tc, Ru, Rh, Pd, Ag, Cd, In, Sn, Hf, Ta, W, Ge, Os, Ir, Pt, Au, Tl, Pb, Bi and a mixture thereof.

3. The method of claim 1, wherein the base material for fabricating the optical fiber or the optical device has a basic composition comprising a silicon oxide.

4. The method of claim 1, wherein the base material for fabricating the optical fiber or the optical device has a basic composition comprising a mixture of a silicon oxide and a second oxide selected from the group consisting of germanium oxide ($GeO_2$), boron oxide ($B_2O_3$), phosphorous oxide ($P_2O_5$), titanium oxide ($TiO_2$), and a mixture thereof.

5. The method of claim 1, wherein the base material for fabricating the optical fiber or the optical device has a basic composition selected from the group consisting of silica ($SiO_2$), germanosilicate ($SiO_2$—$GeO_2$), phosphorosilicate ($SiO_2$—$P_2O_5$) phosphorogermanosilicate ($SiO_2$—$GeO_2$—$P_2O_5$), borosilicate ($SiO_2$—$B_2O_3$), borophosphorosilicate ($SiO_2$—$P_2O_5$—$B_2O_3$), borogermanosilicate ($SiO_2$—$GeO_2$—$B_2O_3$), titanosilicate ($SiO_2$—$TiO_2$), phosphorotitanosilicate ($SiO_2$—$TiO_2$—$P_2O_5$), and borotitanosilicate ($SiO_2$—$TiO_2$—$B_2O_3$).

6. The method of claim 1, wherein, the step of forming the partially-sintered fine structure in the base material is performed by a process selected from the group consisting of MCVD (modified chemical vapor deposition), VAD (vapor-phase axial deposition), VOD (outside vapor deposition), and FHD (flame hydrolysis deposition).

* * * * *